United States Patent
Ushiro et al.

(10) Patent No.: US 7,181,106 B2
(45) Date of Patent: Feb. 20, 2007

(54) OPTICAL FIBER CAPPED AT END WITH DIFFRACTIVE FILM, AND MANUFACTURING METHOD THEREFOR

(75) Inventors: Toshihiko Ushiro, Itami (JP); Soichiro Okubo, Itami (JP); Takashi Matsuura, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/506,492

(22) PCT Filed: Dec. 4, 2003

(86) PCT No.: PCT/JP03/15563

§ 371 (c)(1),
(2), (4) Date: Sep. 3, 2004

(87) PCT Pub. No.: WO2004/055560

PCT Pub. Date: Jul. 1, 2004

(65) Prior Publication Data

US 2005/0254751 A1 Nov. 17, 2005

(30) Foreign Application Priority Data

Dec. 16, 2002 (JP) ............................... 2002-363345

(51) Int. Cl.
G02B 6/34 (2006.01)
G02B 6/26 (2006.01)
G02B 6/32 (2006.01)
G02B 5/18 (2006.01)
G02B 27/42 (2006.01)

(52) U.S. Cl. ............................ 385/37; 385/31; 385/34; 359/566; 359/568

(58) Field of Classification Search .................. 385/34, 385/31, 37
See application file for complete search history.

(56) References Cited

U.S. PATENT DOCUMENTS 4,647,512 A 3/1987 Venkataramanan et al.
4,693,544 A * 9/1987 Yamasaki et al. ............. 385/47

(Continued)

FOREIGN PATENT DOCUMENTS

EP 1-162-519 A1 12/2001

(Continued)

OTHER PUBLICATIONS

T. Glaser et al., "Diffractive optical isolator made of high-efficiency dielectric gratings only," Applied Optics, vol. 41, No. 18, Jun. 20, 2002, pp. 3558-3566.

(Continued)

Primary Examiner—John D. Lee
Assistant Examiner—Rhonda S. Peace
(74) Attorney, Agent, or Firm—James W. Judge (57) ABSTRACT

Affords efficiently and at low cost optical fibers capped at the end with a working, tiny optically diffractive film. An optical fiber includes a diffractive film formed onto an endface thereof, or onto the endface of a collimator joined to the endface of the fiber; the diffractive film includes a transparent DLC (diamond-like carbon) layer; and the DLC layer includes a modulated-refractive-index diffraction grating containing local regions of relatively high refractive index and local regions of relatively low refractive index.

19 Claims, 7 Drawing Sheets

U.S. PATENT DOCUMENTS

| | | | |
|---|---|---|---|
| 4,747,654 A | | 5/1988 | Yi-Yan |
| 5,138,495 A | * | 8/1992 | Shiono et al. .............. 359/742 |
| 5,352,493 A | * | 10/1994 | Dorfman et al. ............ 427/530 |
| H1461 H | * | 7/1995 | DiVita et al. ................ 428/375 |
| 5,718,976 A | * | 2/1998 | Dorfman et al. ............ 428/408 |
| 5,948,166 A | * | 9/1999 | David et al. ................. 118/718 |
| 5,999,671 A | * | 12/1999 | Jin et al. ....................... 385/37 |
| 6,388,811 B1 | * | 5/2002 | Iizuka et al. ................. 359/570 |
| 6,795,636 B1 | * | 9/2004 | Cronk et al. ................. 385/141 |
| 7,019,904 B2 | * | 3/2006 | Shiozaki et al. ............ 359/569 |
| 2003/0117706 A1 | | 6/2003 | Okubo et al. |
| 2004/0247243 A1 | * | 12/2004 | Hida et al. ..................... 385/37 |
| 2005/0230687 A1 | * | 10/2005 | Ushiro et al. ................. 257/79 |
| 2006/0139756 A1 | * | 6/2006 | Shiozaki et al. ............ 359/573 |
| 2006/0146408 A1 | * | 7/2006 | Ushiro et al. ................ 359/566 |

FOREIGN PATENT DOCUMENTS

| | | |
|---|---|---|
| JP | S52-146648 A | 12/1977 |
| JP | S59-220705 A | 12/1984 |
| JP | S61-213802 A | 9/1986 |
| JP | S61-230107 A | 10/1986 |
| JP | S62-278264 A | 12/1987 |
| JP | H02-139502 A | 5/1990 |
| JP | H06-051214 A | 2/1994 |
| JP | H09-318980 A | 12/1997 |
| JP | H10-062625 A | 3/1998 |
| JP | H10-209554 A | 8/1998 |
| JP | 2000-137138 A | 5/2000 |
| JP | 2001-236002 A | 8/2001 |

OTHER PUBLICATIONS

M. Fujimaki et al., "Ko-energy Ion Shosha ni yoru Silica Garasu no Komitsudoka," The Institute of Electrical Engineers of Japan Kenkyukai Shiryo, DEI-00-14, pp. 19-24.

J. Heibei et al., "Refractive Index Profiles of Ion-Implanted Fused Silica," physica status solidi (a), Feb. 1980, vol. 57, No. 2, pp. 609-618.

* cited by examiner

Linewidth: 4 μm

OPTICAL FIBER CAPPED AT END WITH DIFFRACTIVE FILM, AND MANUFACTURING METHOD THEREFOR

TECHNICAL FIELD

The present invention relates optical fibers having an optically diffractive film on an end thereof, and to methods of manufacturing such optical fibers. More specifically, the invention relates to optical fibers capped on an end with an optically diffractive film having wavelength-division multiplexing/demultiplexing, power-splitting/combining, polarization-division multiplexing/demultiplexing, wave-plate, or optical-isolator functionality, and to methods of manufacturing such optical fibers.

BACKGROUND ART

As is widely known, diffractive optical elements that produce diffraction of light can be employed in a variety of applications. For example, wavelength multiplexers/demultiplexers, optical couplers, optical isolators, and like devices used in optical communications fields can be manufactured employing diffractive optical elements.

Diffractive optical elements generally are manufactured by forming a diffraction-grating layer on a transparent substrate. Diffractive optical elements are grossly divided, based on structural differences in the diffraction-grating layer, into modulated-refractive-index and surface-relief types.

Figure 14:
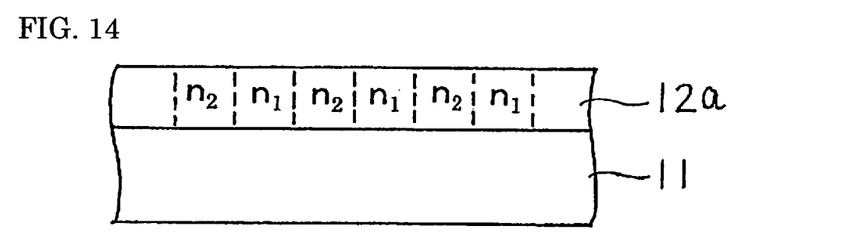
FIG. 14 is a schematic sectional view representing an example of a conventional modulated-refractive-index type of diffractive optical element.

FIG. 14 depicts, in a schematic sectional view, an example of a modulated-refractive-index type of diffractive optical element. It should be understood that in the drawings for the present application, dimensional proportions such as width and thickness have been altered as appropriate in order to clarify and simplify the figures, and do not reflect the proportions in their actual relationships. This modulated-refractive-index optical element includes a diffraction-grating layer 12a formed on a transparent substrate 11, wherein a modulated-refractive-index structure has been created in the diffraction-grating layer 12a. In particular, local regions having a relatively small refractive index $n_1$ and local regions having a relatively large refractive index $n_2$ are periodically formed in alternation in the diffraction-grating layer 12a. This enables the occurrence of a diffraction phenomenon originating in the phase difference that arises between light passing through the regions of low refractive index $n_1$ and light passing through the regions of high refractive index $n_2$.

The diffraction-grating layer 12a having the modulated-refractive-index structure can be formed utilizing for example a material whose refractive index is increased by the material undergoing energy-beam irradiation. For instance, increasing the refractive index of Ge-doped quartz glass by means of ultraviolet irradiation is known. Likewise, irradiating quartz glass with X-rays to increase the refractive index of the glass is known. Accordingly, a diffraction-grating layer 12a as illustrated in FIG. 14 can be created by depositing a quartz-glass layer of refractive index $n_1$ onto a transparent substrate 11 and irradiating the glass layer with an energy beam in a periodic pattern to raise the refractive index locally to $n_2$.

Figure 15:
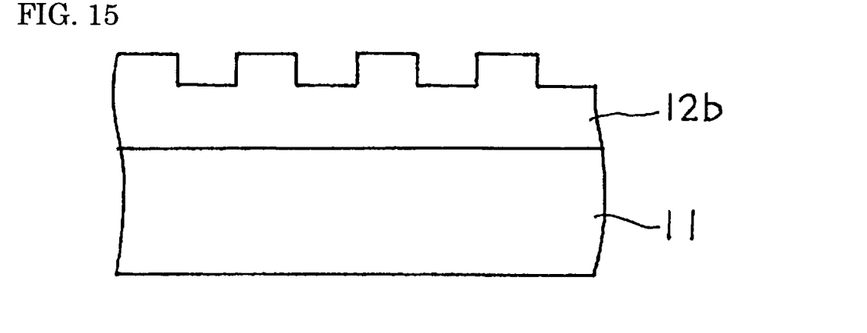
FIG. 15 is a schematic sectional view illustrating an example of a conventional surface-relief type of diffractive optical element.

FIG. 15 illustrates, in a schematic sectional view, an example of a surface-relief type of diffractive optical element. This surface-relief diffractive optical element includes a diffraction-grating layer 12b formed on a transparent substrate 11, wherein a relief structure has been embossed in the diffraction-grating layer 12b. In particular, local regions having a relatively large thickness and local regions having a relatively small thickness are periodically formed in alternation in the diffraction-grating layer 12b. This enables the occurrence of a diffraction phenomenon originating in the phase difference that arises between light passing through the regions of large thickness and light passing through the regions of small thickness.

The diffraction-grating layer 12b having the surface-relief structure can be formed by for example depositing a quartz glass layer onto a transparent substrate 11 and employing photolithography and etching to process the glass layer.

Figure 16:
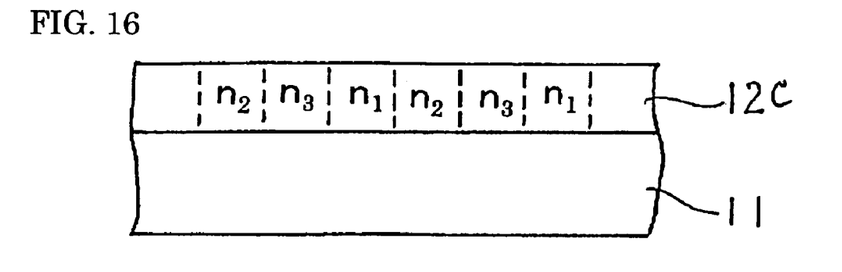
FIG. 16 is a schematic sectional view representing one more example of a conventional modulated-refractive-index type of diffractive optical element.

FIG. 16 depicts, in a schematic sectional view, one more example of a modulated-refractive-index type of diffractive optical element. The modulated-refractive-index optical element of FIG. 16 resembles that of FIG. 14, but within a diffraction-grating layer 12c in FIG. 16 local regions having refractive indices $n_1$, $n_2$, $n_3$ of three levels that differ from each other are arrayed periodically. Local regions in this way having three levels of refractive indices $n_1$, $n_2$, $n_3$ can be formed within a diffraction-grating layer 12c by for example depositing onto a substrate 11 a quartz glass layer of refractive index $n_1$ and irradiating the glass layer with an energy beam having two different energy levels.

By means of a diffraction grating that contains local regions whose refractive indices are multilevel, diffraction efficiency can be improved by comparison to the case with a diffraction grating that contains regions whose refractive indices are simply binary. "Diffraction efficiency" herein means the ratio of the sum of the diffracted light energies to the energy of the incident light. This means that from the perspective of putting diffracted light to use, greater diffraction efficiency is to be preferred.

Figure 17:
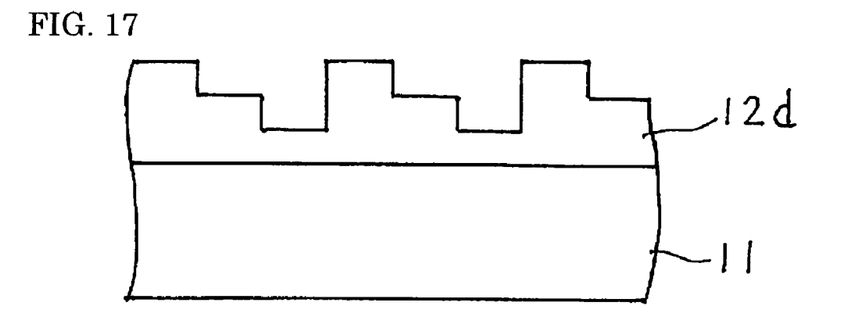
FIG. 17 is a schematic sectional view illustrating one more example of a conventional surface-relief type of diffractive optical element.

FIG. 17 represents, in a schematic sectional view, one more example of a surface-relief type of diffractive optical element. The surface-relief optical element of FIG. 17 resembles that of FIG. 15, but within a diffraction-grating layer 12d in FIG. 17 local regions having thicknesses in three levels that differ from each other are arrayed periodically. Local regions in this way having refractive thicknesses in three levels can be formed within a diffraction-grating layer 12d by for example depositing onto a substrate 11 a quartz glass layer and repeating a photolithographic and etching process on the glass layer two times. Thus by means of a diffraction grating that contains local regions having a multilevel profile, diffraction efficiency can be improved by comparison to the case with a diffraction grating that contains simple binary thicknesses.

It should be noted that while modulated-refractive-index diffraction gratings in which the refractive indices within the diffraction grating layer are varied in stages are illustrated in FIGS. 14 and 16, also formable are modulated-refractive-index diffraction gratings in which the refractive indices are varied continuously. In that case the energy level of the energy beam used for irradiating in order to raise the refractive index should be varied continuously.

Figure 18:
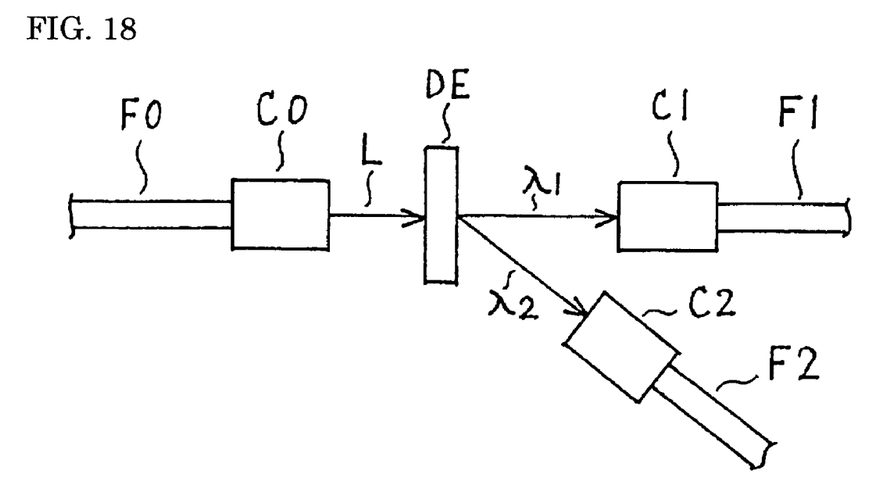
FIG. 18 is a schematic view representing a conventional wavelength-demultiplexing circuit for optical communications.

FIG. 18 schematically represents an example of the use of a diffractive optical element in an optical communications application. In the figure, collimators C0, C1 and C2 are respectively joined to the end faces of optical fibers F0, F1 and F2. Parallel-ray beam L, introduced through optical fiber F0 and output via collimator C0, can be split by a diffractive optical element DE into, for example, a beam of wavelength $\lambda_1$ and a beam of wavelength $\lambda_2$. This is because the diffraction angle of the beam will differ depending on the wavelength $\lambda$.

Thus a beam having a wavelength of $\lambda_1$ can be input from collimator C1 into optical fiber F1, while a beam having a wavelength of $\lambda_2$ can be input from collimator C2 into optical fiber F2. In other words, the demultiplexing functionality of the diffractive optical element DE is exploited in this case. Of course, conversely, a beam of wavelength $\lambda_1$ output from optical fiber F1 via collimator C1, and a beam of wavelength $\lambda_2$ output from optical fiber F2 via collimator C2 can be combined through the diffractive optical element DE and input into optical fiber F0 via collimator C0. This means that the diffractive optical element DE can demonstrate multiplexing/demultiplexing functionality. Thus a diffractive optical element of this sort having wavelength-division multiplexing/demultiplexing functionality is able to perform a crucial role in wavelength-division multiplexed (WDM) optical communications.

Although modulated-refractive-index diffractive optical elements such as described above are manufacturable in principle, in practice producing modulated-refractive-index diffractive optical elements is problematic. The reason is because the amount of refractive-index variation obtainable by irradiating for example quartz glass with an energy beam is at the very most 0.002 or so, which is prohibitive of creating an effective diffraction-grating layer.

Consequently, the general practice at present is—as set forth for example in Patent Reference 1, Japanese Unexamined Pat. App. Pub. No. S61-213802, and in Non-Patent Reference 1, *Applied Optics*, Vol. 41, 2002, pp. 3558–3566—to employ surface-relief types as diffractive optical elements. Nevertheless, the photolithography and etching necessary for fabricating relief diffractive optical elements are considerably complex manufacturing processes requiring a fair amount of time and trouble, besides which controlling the etching depth with precision is no easy matter. What is more, a problem with surface-relief diffractive optical elements is that since microscopic corrugations are formed in the element face, dust and dirt are liable to adhere.

Meanwhile, in a drop optical circuit such as represented in FIG. 18, the diffractive optical element DE, some several mm across, must be aligned and fixed in place with respect to the semiconductor laser LD and the optical fibers F0 through F2 atop a (non-illustrated) support base. This means that in a conventional diffractive optical element, the optical fibers are separate, individual optical components, which costs trouble in handling and has been prohibitive of scaling down the optical path.

An object of the present invention, in view of the situation as in the foregoing with prior technology, is efficiently and at low cost to make available optical fibers capped on an end with a working, tiny optically diffractive film.

Patent Reference 1
  Japanese Unexamined Pat. App. Pub. No. S61-213802.

Non-Patent Reference 1
  *Applied Optics*, Vol. 41, 2002, pp. 3558–3566.

DISCLOSURE OF INVENTION

According to the present invention, an optical fiber is characterized in including an optically diffractive film formed onto an endface of the fiber, or onto the endface of a collimator joined to the endface of the fiber; the diffractive film, in including a transparent DLC (diamond-like carbon) layer; and the DLC layer, in including a diffraction grating containing local regions of relatively high refractive index and local regions of relatively low refractive index.

A diffractive film of this sort allows a single optical beam that includes a plurality of wavelengths to be split into a plurality of beams depending on the wavelength, and is capable of functioning as a wavelength-division multiplexer/demultiplexer that can cause a plurality of beams having different wavelengths to combine into a unitary optical beam.

The diffractive film as such also allows an optical beam of a single wavelength to be split into a plurality of beams, and is capable of functioning as a power splitter/combiner that can cause a plurality of single-wavelength beams to combine into a unitary optical beam.

Moreover, a diffractive film of this sort is capable of functioning as a polarization-division multiplexer/demultiplexer that can cause TE waves and TM waves contained in an optical beam of a single wavelength to separate and to unite. The diffractive film as such is also capable of functioning as a wave plate with respect to either TE waves or TM waves contained in a single-wavelength optical beam.

Another possibility according to the present invention is creating optical-isolator functionality in the diffractive film by combining therein a first DLC layer containing a diffraction grating having the above-described polarization-division demultiplexing functionality, with a second DLC layer containing a diffraction grating having wave-plate functionality. If the thickness of a diffractive film thus having optical-isolator functionality is 20 μm or less, then the endfaces of two optical fibers can abut and be connected via the diffractive film without a collimator or condenser being required. The reason why is because the optical divergence in a micro-distance of 20 μm or less is negligible. Accordingly, the end of an optical fiber capped with a thin diffractive film of this sort advantageously may be retained in a connector for abutting the fiber end against and connecting it to the endface of another optical fiber. Here, a transparent interlayer may be inserted in between the first DLC layer and the second DLC layer.

Furthermore, the diffraction grating that the diffractive film includes can be such that the grating is functional with respect to light containing wavelengths within a range of from 0.8 μm to 2.0 μm.

In a method according to the present invention of manufacturing an optical fiber as related above, the high refractive-index regions contained in the diffraction grating(s) can be formed by irradiating the DLC layer(s) in a predetermined pattern with an energy beam to raise the refractive index of the layer(s).

In an implementation in which a transparent interlayer is inserted in between the first DLC layer and the second DLC layer to create optical-isolator functionality, the first DLC layer can be deposited onto an endface of the fiber, or onto the endface of a collimator joined to the endface of the fiber and irradiated with an energy beam to form in a first predetermined pattern the high-refractive index regions in the first DLC layer; the transparent interlayer and the second DLC layer can be deposited in turn; and the second DLC layer can be irradiated with an energy beam to form in a second predetermined pattern the high-refractive index regions therein; wherein when the second DLC layer is being irradiated in the second predetermined pattern with an energy beam, the transparent interlayer can act to prevent the energy beam from having an effect on the first DLC layer.

The energy beam for raising refractive index can be chosen from an X-ray beam, an electron beam, or an ion beam, and the DLC layer(s) can be deposited by a plasma CVD technique.

BEST MODE FOR CARRYING OUT THE INVENTION

Figure 1:
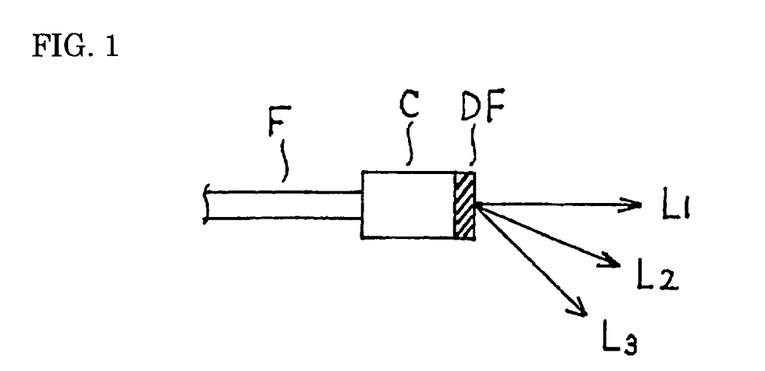
FIG. 1 is a schematic view representing in the present invention an optical fiber having a diffractive film on one end thereof

FIG. 1 schematically depicts one example of an optical fiber according to the present invention. In this example, a circularly cylindrical collimator C is joined onto the endface of an optical fiber F that includes a core approximately 10 µm in diameter and has an outer diameter of approximately 125 µm (including its cladding). The cylindrical collimator C has a cross-sectional diameter of approximately 3 mm, with light from the optical fiber F being output as a parallel-ray beam of approximately 350 µm in cross-sectional diameter.

Both the endfaces of the cylindrical collimator C are flat. A distributed-refractive-index lens that functions as a lens by virtue of the refractive index varying in radial a continuum can be employed as a cylindrical collimator C of this sort. Such distributed-refractive-index lenses are manufactured as components made of glass or plastic using ion-exchange or dispersion polymerization techniques.

Of the two endfaces of the cylindrical collimator C, onto that endface to which the optical fiber F is not joined, an optically diffractive film DF containing a transparent DLC (diamond-like carbon) layer is formed. The DLC layer contains a modulated-refractive-index diffraction grating formed by irradiating the layer with an energy beam such as an ion beam to raise the refractive index locally. Accordingly, the optical beam output from the optical fiber F via the collimator C is diffracted by the diffractive film DF and separated into a plurality of beams—for example, L1, L2, L3, etc.—depending on the diffraction angle. It will be readily appreciated that on the other hand, if this plurality of beams L1, L2, L3, etc. is shone into the diffractive film DF in the reverse direction, the beams will be united by the diffractive film DF and input into the optical fiber F via the collimator C Embodiment 1

Figure 2:
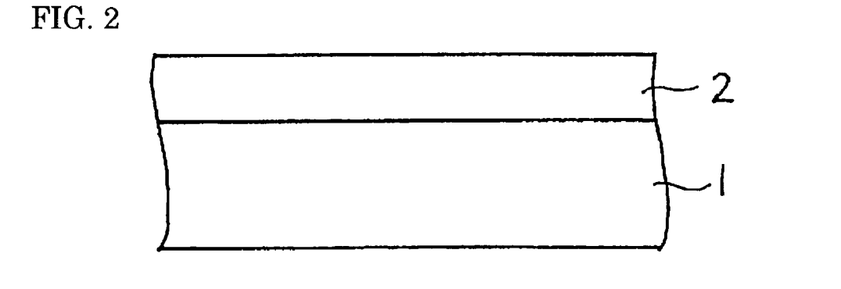
FIG. 2 is a schematic sectional view depicting an example of a stage in a diffractive-film production technique in the present invention.
Figure 3:
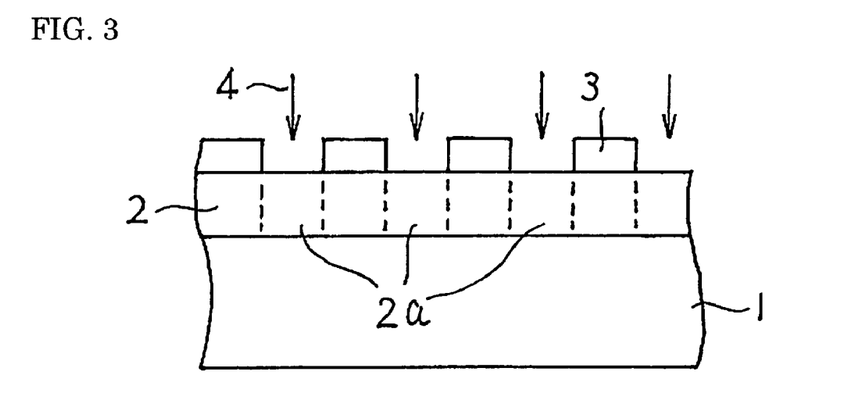
FIG. 3 is a schematic sectional view depicting an example of a stage in a diffractive-film production technique in the present invention.
Figure 4:
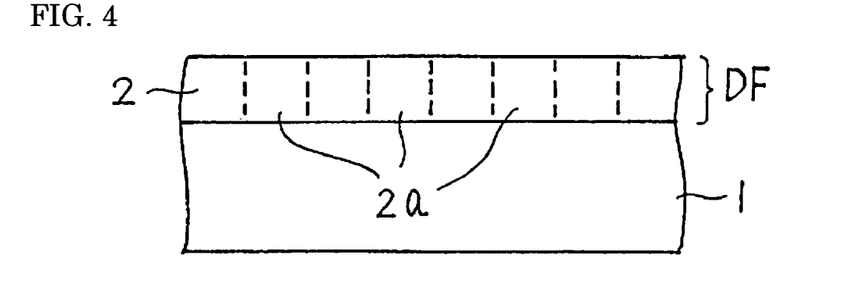
FIG. 4 is a schematic sectional view depicting an example of a stage in a diffractive-film production technique in the present invention.

FIGS. 2 through 4 are schematic sectional views that depict one example of a method of manufacturing a modulated-refractive-index diffractive film in Embodiment 1 of the present invention.

Onto an $SiO_2$ substrate 1, as represented in FIG. 2, having a 1.44 refractive index and having a 5 mm×5 mm principal face, a DLC layer 2 was deposited by plasma CVD to a thickness of 2 µm.

A gold mask 3 in FIG. 3 was formed onto the DLC layer 2 by a lift-off technique. In the gold mask 3, gold stripes of 0.5 µm width and 5 mm length were arrayed in iterations at a pitch of 0.5 µm. That is, the gold mask 3 had a "line & space" pattern. The DLC layer 2 was thereafter implanted in an orthogonal direction through the apertures in the gold mask 3 with an He ion beam 4 at a dose of $5 \times 10^{17}/cm^2$ under an 800-keV acceleration voltage.

As a result, the regions within the DLC layer that were not implanted with He ions had a refractive index of 1.55, while the refractive index of the regions 2a that were implanted with He ions was raised to 2.05. Such refractive-index variation in a DLC layer was far larger by comparison to refractive-index variation that can be produced in quartz glass, enabling a diffraction-grating layer of sufficiently large diffraction efficiency to be created.

In FIG. 4, etching removal of the gold mask 3 has yielded a modulated-refractive-index diffractive film DF. It will be appreciated that the diffraction-grating layer 2 in this diffractive film DF contains regions of two types—refractive index 1.55 and 2.05—and thus is a so-called binary-level diffraction-grating layer.

Figure 5:
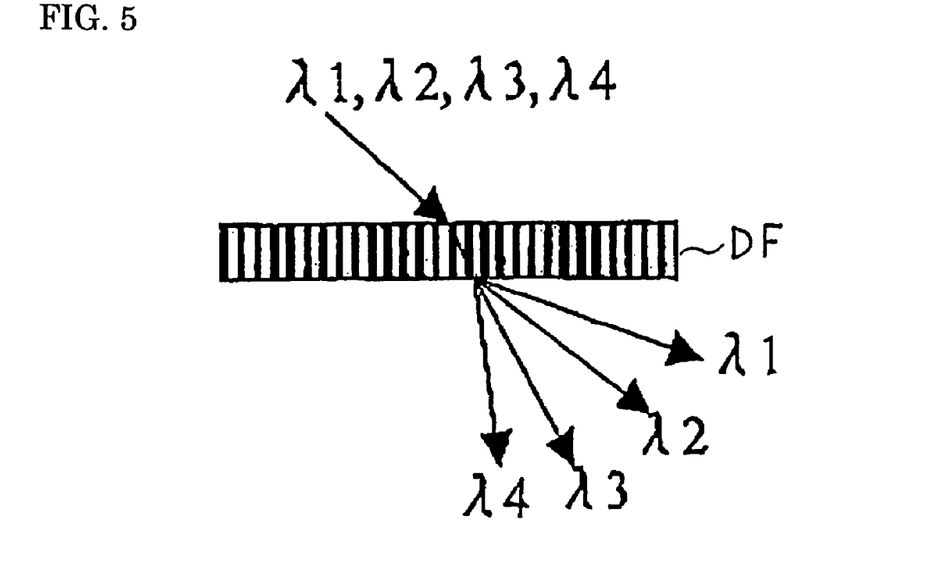
FIG. 5 is a schematic sectional view depicting the wavelength-demultiplexing action of a wavelength-division multiplexer/demultiplexer in the present invention.

FIG. 5 depicts in a schematic sectional view wavelength-demultiplexing action in an implementation in which the obtained modulated-refractive-index diffractive film DF was utilized as a wavelength-division multiplexer/demultiplexer.

In this sectional drawing, the section areas in black represent regions of relatively high refractive index, while the section areas in white represent regions of relatively low refractive index. As is indicated in FIG. 5, if a single optical beam containing a plurality of wavelengths $\lambda_1$, $\lambda_2$, $\lambda_3$, $\lambda_4$, for example, is made incident onto the diffractive film DF, the diffraction angles of the rays that pass through the diffractive film differ from one another depending on the wavelength. This means that a single incident beam containing a plurality of wavelengths can be separated into a plurality of diffraction beams that wavelength by wavelength differ in advancing direction.

Of course, it should be evident that if the sense of the incident light beam and the diffraction beams indicated by the arrows in FIG. 5 is reversed, the diffractive film DF in FIG. 5 can be utilized as a multiplexer. It is to be noted that in implementations in which the diffractive film is utilized as a wavelength division demultiplexer, the optical beam is generally made incident on the diffractive film at a suitable angle within a range of 0–70 degrees or so relative to a line normal to the film surface. This angle range, however, relates to the situation in which the high refractive-index regions have been formed in an orientation orthogonal to the face of the DLC layer; in a case in which, with the ion beam being diagonally directed onto the DLC layer face, the high refractive-index regions have been formed in the surface of the DLC layer at a slant for example, the incident angle of the optical beam would be adjusted taking the angle of slant into consideration.

Figure 6:
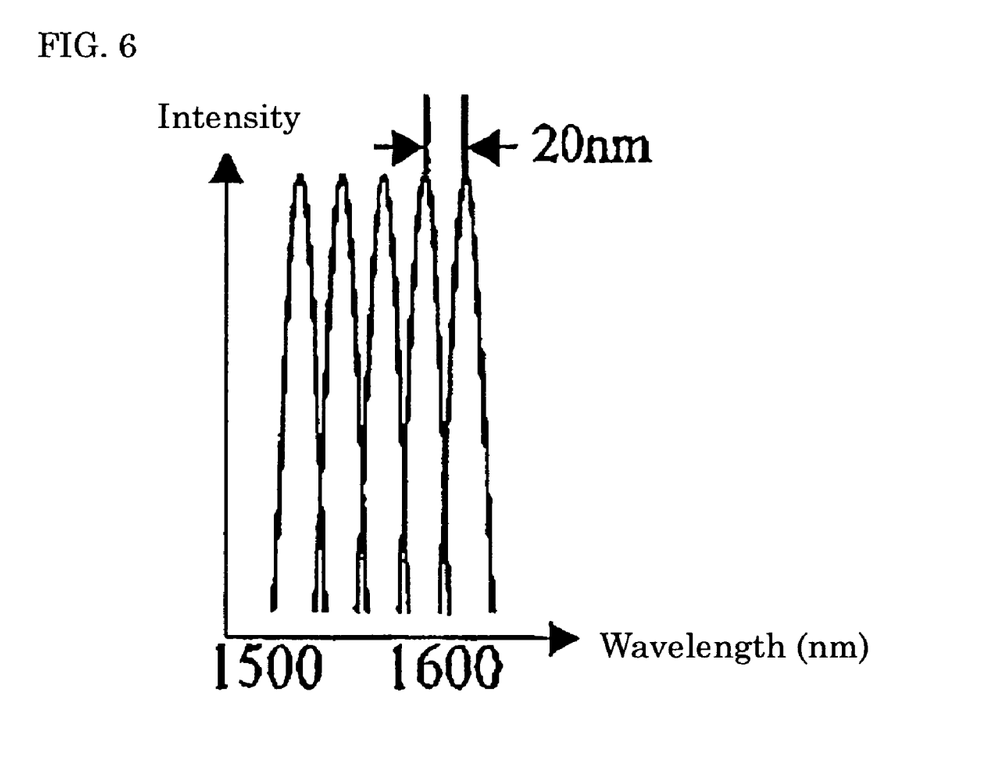
FIG. 6 is a graph showing one example of the relationship between wavelength and intensity distribution of light demultiplexed by a wavelength-division multiplexer/demultiplexer in the present invention.

In the present Embodiment 1, a diffractive film DF having a line & space pattern-in which by diagonal irradiation with an ion beam, gold stripes of 0.5 µm width were arrayed in iterations at a pitch of 0.5 µm—was formed onto one of the endfaces of a collimator C and, as represented in FIG. 1, the other end of the collimator C was connected to the endface of an optical fiber F FIG. 6 is a graph that schematically represents one example of wavelength-demultiplexing results in the optical fiber F furnished at one end with the collimator C on the endface of which the diffractive film DF having the line & space pattern just noted was formed. The horizontal axis in the graph represents diffraction-light wavelength (nm), while the vertical axis represents the diffraction-light intensity in arbitrary units. In this case, light having a wavelength range of 1.5 to 1.6 µm and a beam diameter of 350 µm was presented to the diffractive film DF via the optical fiber F and the collimator C (cf. FIG. 1). As a result, five diffraction beams having wavelengths distributed at 20-nm intervals in a spectrum from 1.5 µm to 1.6 µm as shown in FIG. 6 were produced, with the five diffraction beams having approximately equal intensity. And with the diffraction efficiency in that case then being nearly 99%, quite outstanding wavelength demultiplexing properties were achieved.

It should be understood that in Embodiment 1, because a linear, one-dimensional diffraction-grating pattern is utilized the plural diffraction beams are present lying in a single plane that contains the incident beam. Nevertheless, it will be understood that by utilizing a two-dimensional diffraction-grating pattern—as in Embodiment 2, which will be set forth next—in an orthogonal sectional plane the plural diffraction beams can be distributed two-dimensionally.

Embodiment 2

Figure 7:
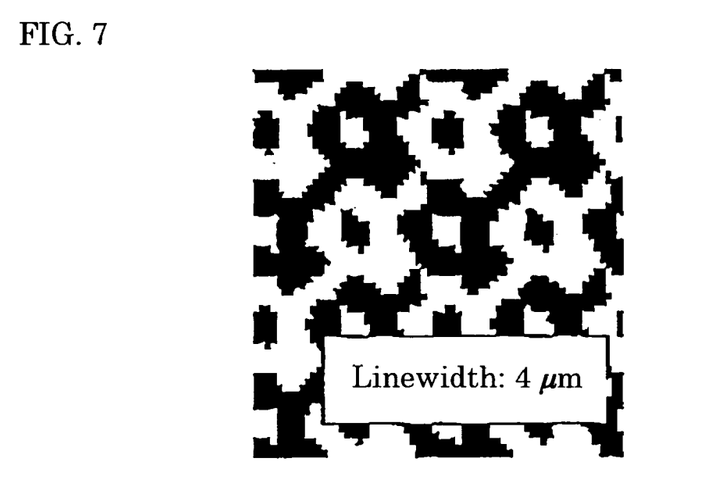
FIG. 7 is a schematic plan view showing an example of a diffraction-grating pattern in an optical power splitter in the present invention.

FIG. 7 shows, in a schematic plan view, a two-dimensional diffraction-grating pattern in a diffractive film in Embodiment 2. The diffractive film in Embodiment 2 can be fabricated by the same manufacturing process as was the case with Embodiment 1. In particular, the black regions in FIG. 7 represent where within the DLC layer the refractive index was raised by irradiating the regions with the He ion beam, while the white areas represent regions that were not irradiated with the He ion beam. The black pattern was formed by combining 4 µm×4 µm microcells, and therein had a periodicity of 132 µm. This means that the minimum linewidth in the diffraction-grating pattern illustrated in FIG. 7 is 4 µm.

Figure 8:
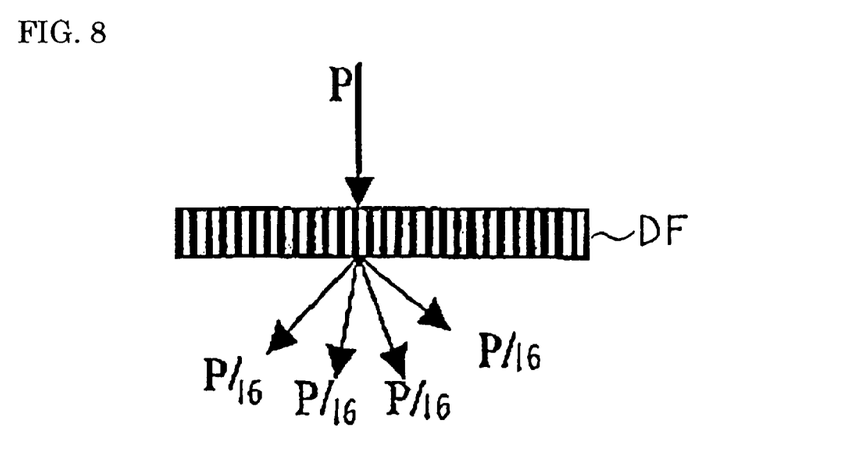
FIG. 8 is a schematic sectional view depicting the power-splitting action in an optical power splitter in the present invention.

FIG. 8 depicts, in a schematic sectional view, power-splitting action in a case in which the modulated-refractive-index diffractive film in Embodiment 2 is employed as an optical coupler (power splitting device). In particular, if a beam of light of a single wavelength is made incident on the diffractive film DF, the diffraction angle of the rays that pass through the diffractive film differ from one another depending on the order of diffraction. Consequently, an incident beam of a single wavelength can be separated into a plurality of optical diffraction beams.

Figure 9:
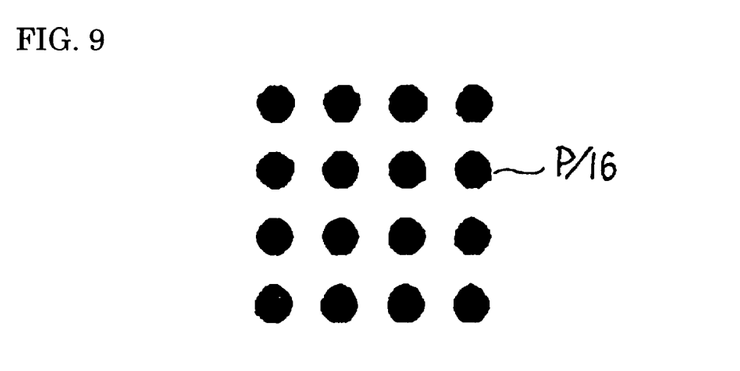
FIG. 9 is a planar view showing the beam distribution within a plane intersecting a plurality of diffraction beams from power-splitting by the optical power splitter of FIG. 7.

FIG. 9 is a plan view representing beam distribution within a plane orthogonal to a diffraction beam having been power-split, as in FIG. 8, into a plurality by the optical coupler of FIG. 7. More specifically, an incident beam having power P can be split into 16 diffraction beams each having power P/16.

In embodiment 2, an optical fiber F was connected to one endface of a collimator C onto the other endface of which a diffractive film DF having a diffraction-grating pattern as is illustrated in FIG. 7 was formed, and light of 350 µm beam diameter having a wavelength of 1.55 µm was made perpendicularly incident on the diffractive film DF (cf. FIG. 1), wherein diffraction beams in 16 splits distributed in four-fold symmetry as is represented in FIG. 9 were produced.

It will be appreciated that a diffraction-grating pattern of FIG. 7 enabling the realization of a plural-diffraction-beam distribution pattern as is shown in FIG. 9 can, as is widely known, be found using a Fourier transform.

Embodiment 3

In Embodiment 3, an optical fiber including a diffractive film having polarization-division multiplexing/demultiplexing functionality was fabricated. In Embodiment 3 as well, a DLC diffraction-grating layer having a line & space pattern was formed by the same manufacturing process as was the case with Embodiment 1. In Embodiment 3, however, high refractive-index regions of 0.4 µm width were arrayed in iterations at a pitch of 0.4 µm.

Figure 10:
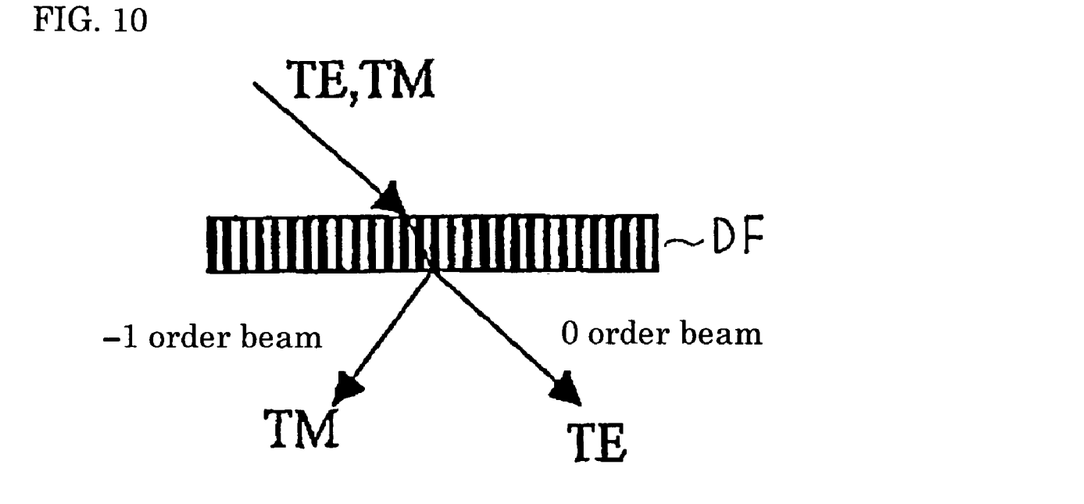
FIG. 10 is a schematic sectional view depicting polarization-demultiplexing action in a polarization demultiplexer in the present invention.

FIG. 10 depicts in a schematic sectional view polarization-demultiplexing action in an implementation in which the modulated-refractive-index diffractive film DF in Embodiment 3 is employed as a polarization-division multiplexer/demultiplexer. In particular, if a TEM wave including a TE component and a TM component is made incident on the diffractive film DF in Embodiment 3, the TE wave and the TM wave will, depending on the difference in polarization between them, be diffracted at diffraction angles that differ from each other. For example, as is illustrated in FIG. 10, the TE wave is obtained as a 0 order diffraction beam, while the TM wave is obtained as a −1 order diffraction beam. The splitting off of TE and TM waves is in this way made possible.

In Embodiment 3, an optical fiber F (cf FIG. 1) was connected to one endface of a collimator C onto the other endface of which a diffractive film DF having a diffraction-grating pattern—in which by diagonal irradiation with an ion beam, high refractive-index regions of 0.4 µm width were arrayed in iterations at a pitch of 0.4 µm—was formed, and light of 350 μm beam diameter having a wavelength of 1.55 μm was output via the diffractive film DF, wherein a TE-polarized wave and a TM-polarized wave could be split off.

Embodiment 4

Prepared in Embodiment 4 was an optical fiber F(cf. FIG. 1), furnished at an end thereof with a collimator C on an endface of which was formed a diffractive film DF having wave-plate functionality. With the diffractive film of Embodiment 4 as well, a DLC diffraction-grating layer having a line & space pattern was formed by the same manufacturing process as was the case with Embodiment 1. In Embodiment 4, however, high refractive-index regions of 0.2 μm width were arrayed in iterations at a pitch of 0.2 μm. A further difference was that the optical fiber F utilized in Embodiment 4 was not a single-mode fiber as was the case with the other embodiments, but was a polarization-holding fiber.

Linearly polarized light 1.55 μm in wavelength was input into what was thus a polarization-holding fiber F, and the beam output from the diffractive film DF via the collimator C was converted into circularly polarized light. This means that the diffractive film DF in Embodiment 4 functioned as a quarter-wave plate, producing a polarization conversion effect.

Embodiment 5

Figure 11:
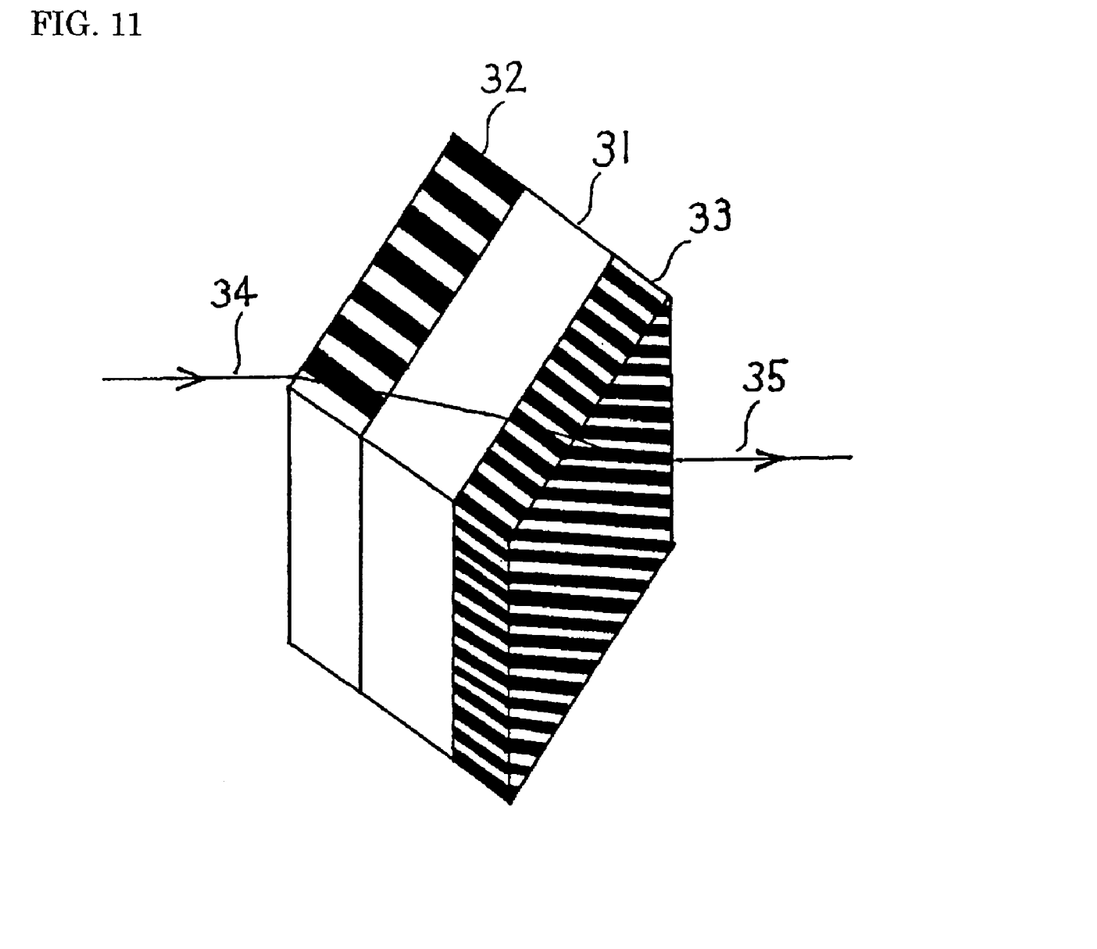
FIG. 11 is a schematic axonometric drawing depicting the functioning in the present invention of a diffractive film capable of operating as an optical isolator.

FIG. 11, a schematic axonometric drawing, models the functioning as an optical isolator of a diffractive optical element, in Embodiment 5, that is practicable for an optical fiber. In this diffractive optical element a first DLC layer 32 has been formed onto a first principal face of a quartz glass substrate 31, and a second DLC layer 33 has been formed onto the second principal face. Then the same diffraction grating as in Embodiment 3 has been formed in the first DLC layer 32, and the same diffraction grating as in Embodiment 4 has been formed in the second DLC layer 33.

If an optical beam of 1.55 μm wavelength is made incident on the diffractive optical element of FIG. 11, though a ray 35 having passed through the first diffraction-grating layer 32, functioning as a polarization demultiplexer, and the second, diffraction optics layer 33, functioning as a quarter-wave plate, is back-reflected from some object, it cannot pass through the quarter-wave plate 33 and the polarization demultiplexer 32—which operate interactively as an optical isolator—and return.

Figure 12:
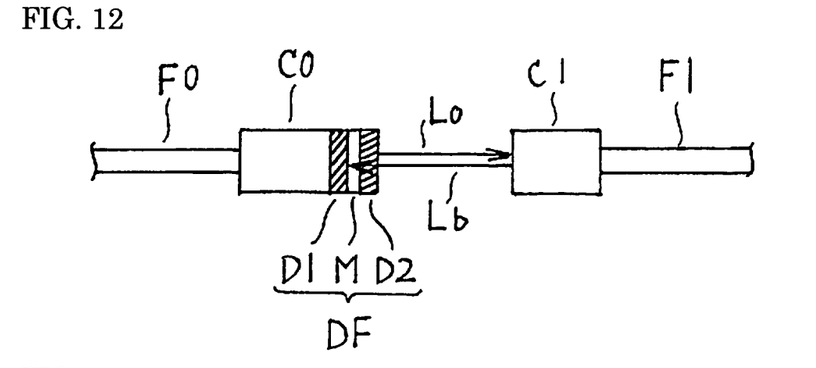
FIG. 12 is a schematic view depicting an optical fiber having on an end thereof an optical isolator according to the present invention.

As represented schematically in FIG. 12, in Embodiment 5 a diffractive film DF having optical-isolator functionality was formed onto one endface of a collimator C0, and an optical fiber F0 was joined to the other endface of the collimator. With this diffractive film DC, a first DLC layer D1 was formed onto the one endface of the collimator C0, and the same diffraction grating as in Embodiment 3 having polarization-demultiplexing functionality was formed in the first DLC layer D1. After that, an $SiO_2$ interlayer M and a second DLC layer D2 were in turn formed onto the first DLC layer D1. It will be appreciated that the $SiO_2$ interlayer and the second DLC layer D2 can be formed by a CVD technique or an EB (electron beam) vapor deposition technique. Then the same diffraction grating as in Embodiment 4 having quarter-waveplate functionality was formed in the second DLC layer D2. In doing so, while the second DLC layer D2 was being irradiated with the ion beam the interlayer M dependably prevented the ion beam from entering the first DLC layer D1.

From the optical fiber F0 via the collimator C0 optical beam L0, as represented in FIG. 12, of 1.55 μm wavelength and 350 μm cross-sectional diameter was output from the diffractive film DF. In that implementation, even if beam L0 having passed through the first diffraction-grating layer D1, acting as a polarization demultiplexer, and the second diffraction-grating layer D2, acting as a quarter-wave plate, after being presented to another optical fiber F1 via another collimator C1 is back-reflected at some interface and comes back as beam Lb, the light would not be able to pass through the quarter-wave plate D2 and the polarization demultiplexer D1, operating interactively as an optical isolator, and return into the optical fiber F0. As the extinction ratio in that instance—being the ratio of the incident luminous intensity to the transmitted luminous intensity of light returning to the first diffraction-grating layer D1—a value of over 40 dB was obtained.

Embodiment 6

Figure 13:
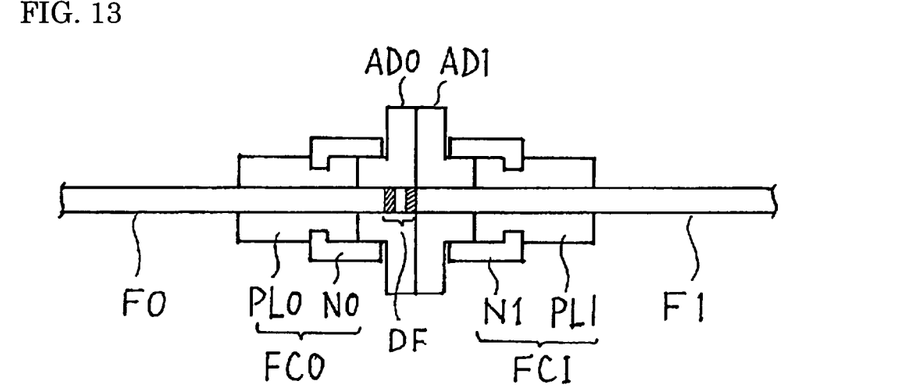
FIG. 13 is a schematic sectional view representing a situation in which an optical fiber having according to the present invention an optical isolator on an end thereof is connected by means of a fiber connector to another optical fiber.

FIG. 13 represents in schematic cross-section a situation in which an optical fiber according to Embodiment 6 is joined to another optical fiber via an optical connector. In this Embodiment 6, a diffractive film DF having the same optical-isolator functionality as was the case with Embodiment 5 has been formed onto, directly in contact with, the endface of an optical fiber F0. In this case, the diffractive film DF has a whole thickness of 20 μm or less.

The end of the optical fiber F0 where it is capped with the diffractive film DF is retained by an FC-type optical connector FC0. The optical connector FC0 includes a plug portion PL0 that retains the end portion of the fiber, and a cinch nut N0 for joining the plug portion to an adapter AD0. In a like manner, the end portion of the other optical fiber F1 is retained by means of an FC-type optical connector FC1. The optical connector FC1 too includes a plug portion PL1 that retains the end portion of the fiber, and a cinch nut N1 for joining the plug portion to an adapter AD1. The two adapters AD0 and AD1 are joined to each other by means of tiny bolts and nuts (not illustrated).

As illustrated in FIG. 13, in Embodiment 6, via the diffractive film DF having optical-isolator functionality the two optical fibers F0 and F1 can be directly connected without requiring collimating or condensing lenses as would otherwise be the case with conventional optical isolators. This is because the diffractive film DF having optical-isolator functionality can be formed at a whole width of 20 μm or less and therefore, influence of divergence on the optical beam can at this micro-distance of 20 μm or less be averted. Here, in order to abut the common ends of the two optical fibers F0 and F1 against each other, a (not illustrated) spring is built into the connectors FC0 and FC1.

Figure 19:
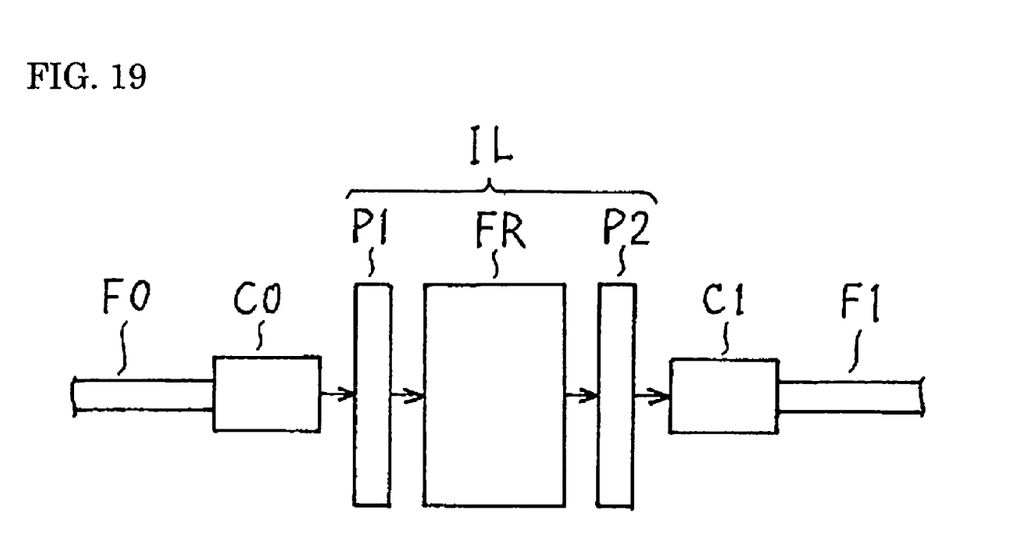
FIG. 19 is a schematic view representing a conventional isolator used in optical communications.

For reference, a conventional isolator used in optical communications is schematically represented in FIG. 19. In this figure, an optical beam output from the optical fiber F0 via the collimator C0, after passing a first polarizer P1, a Faraday rotator FR, and a second polarizer P2, which are included in an isolator IL, is introduced into the optical fiber F1 via the collimator C1.

As is clear from a comparison of FIGS. 13 and 19, in Embodiment 6, two optical fibers can abut and be connected via an optical isolator in an extraordinarily compact fashion relative to what as been the case to date. It will be readily apparent that although in FIG. 13 an FC-type connector is employed in order to abut and connect the two optical fibers via the optical isolator, connectors in a variety of other forms may be employed. Furthermore, the two optical fibers may be brought into abutment and connected via the optical isolator within a V-shaped groove formed on the face of a silicon substrate.

While in the foregoing embodiments examples in which He ion irradiation was employed to raise the refractive index of the DLC layers were explained, it will be appreciated that ion irradiation of other kinds, X-ray irradiation, or electron-beam irradiation for example can also be employed in order to raise the refractive index of the DLC layers. Likewise, in the above-described embodiments explanation regarding incident light within a range of wavelengths from 1.5 μm to 1.6 μm was made, but in the present invention optical fibers having a diffractive film usable for light having any wavelengths within a 0.8 μm to 2.0 μm band with the potential of being employed in optical communications applications can be manufactured.

Furthermore, although in the above-described embodiments, optical fibers having a diffractive film containing a binary-level diffraction grating layer were explained, it will be readily appreciated that diffraction gratings with multi-level or continuously modulated refractive index profiles can also be formed within the DLC layers. In such cases, the DLC layers may be irradiated with, for example, an energy beam in which the energy level and/or dose is varied.

Still further, in the embodiments described above, in most cases the diffractive film DF is formed onto the endface of a collimator, but it will be readily understood that in implementations in which it is so desired, a diffractive film DF may as in Embodiment 6 be formed directly onto the enface of an optical fiber.

INDUSTRIAL APPLICABILITY

As given in the foregoing, the present invention enables practical optical fibers capped at the end with a modulated-refractive-index diffractive film to be made available efficiently and at low-cost. Moreover, in modulated-refractive-index diffractive films made realizable by utilizing DLC layers, since microscopic corrugations are not present in the surface as with surface-relief diffractive optical elements, the surface is unlikely to be contaminated, and even if it is contaminated can be readily cleansed. What is more, because its DLC layer has high resistance to wear, a diffractive film of the present invention formed on the end portion of an optical fiber is advantageous from the perspective that the film surface is unsusceptible to damage.

The invention claimed is:

1. An optical fiber comprising:
an optically diffractive film formed on an end portion of the optical fiber;
a transparent DLC material included in said diffractive film, said transparent DLC material being formed either onto the face of the optical fiber end portion, or onto an endface of a collimator joined to the endface of the optical fiber; and
a diffraction grating included in said DLC material, said diffraction grating containing local regions of relatively high refractive index and local regions of relatively low refractive index.

2. An optical fiber as set forth in claim 1, wherein said diffractive film allows a single optical beam including a plurality of wavelengths to be split into a plurality of beams depending on the wavelength, and functions as a wavelength-division multiplexer/demultiplexer for causing a plurality of beams having different wavelengths to combine into a unitary optical beam.

3. An optical fiber as set forth in claim 1, wherein said diffractive film allows a single-wavelength optical beam to be split into a plurality of beams, and functions as a power splitter/combiner for causing a plurality of single-wavelength beams to combine into a unitary optical beam.

4. An optical fiber as set forth in claim 1, wherein said diffractive film has polarization-division multiplexer/demultiplexer functionality for separating, and causing to unite, TE waves and TM waves contained in a single-wavelength optical beam.

5. An optical fiber as set forth in claim 1, wherein said diffractive film has wave-plate functionality with respect to either TE waves or TM waves contained in a single-wavelength optical beam.

6. A method of manufacturing an optical fiber as set forth in claim 1, the optical-fiber manufacturing method comprising a step of forming the high refractive-index regions contained in the diffraction grating(s) by irradiating said DLC material in a predetermined pattern with an energy beam to raise the refractive index of the DLC material.

7. An optical-fiber manufacturing method as set forth in claim 6, wherein the energy beam is selected from an X-ray beam, an electron beam, or an ion beam.

8. An optical-fiber manufacturing method as set forth in claim 6, wherein said DLC material is deposited by a plasma CVD technique.

9. An optical fiber comprising:
an optically diffractive film formed on an end portion of the optical fiber;
a first transparent DLC layer and a second transparent DLC layer included in said diffractive film and laminated in turn onto an face of the optical fiber end portion, or onto an endface of a collimator joined to the endface of the optical fiber;
a first diffraction grating included in said first DLC layer, said first diffraction grating containing local regions of relatively high refractive index and local regions of relatively low refractive index;
a second diffraction grating included in said second DLC layer, said second diffraction grating containing local regions of relatively high refractive index and local regions of relatively low refractive index; wherein
said first DLC layer has polarization-division demultiplexing functionality for splitting by polarization TE waves and TM waves contained in a single-wavelength optical beam,
said second DLC layer has wave-plate functionality with respect to either TE waves or TM waves contained in a single-wavelength optical beam, and
said first and second DLC layers function interactively as an optical isolator.

10. An optical fiber as set forth in claim 9, wherein said diffractive film is formed onto the endface of the optical fiber, and has a thickness of 20 μm or less.

11. An optical fiber as set forth in claim 10, further comprising a connector for retaining the optical fiber end portion where the diffractive film is formed and for abutting the fiber end portion against and connecting it to an endface of another optical fiber.

12. An optical fiber as set forth in claim 9, further comprising a transparent interlayer inserted in between said first DLC layer and said second DLC layer.

13. A method of manufacturing an optical fiber as set forth in claim 9, the optical-fiber manufacturing method comprising a step of forming the high refractive-index regions contained in the diffraction grating(s) by irradiating said DLC layer(s) in a predetermined pattern with an energy beam to raise the refractive index of the layer(s).

14. An optical-fiber manufacturing method as set forth in claim 13, wherein the energy beam is selected from an X-ray beam, an electron beam, or an ion beam.

15. An optical-fiber manufacturing method as set forth in claim 13, wherein said DLC layer(s) is deposited by a plasma CVD technique.

16. An optical fiber as set forth in claim 1 or 9, wherein said diffractive film includes the diffraction grating being functional with respect to light containing wavelengths within a range of from 0.8 μm to 2.0 μm.

17. A method of manufacturing the optical fiber set forth in claim 12, the optical-fiber manufacturing method comprising steps of:
  depositing said first DLC layer onto the endface of the optical fiber, or onto the endface of the collimator joined to the endface of the optical fiber;
  forming said high-refractive index regions in the first DLC layer by irradiating it with an energy beam to raise its refractive index in a first predetermined pattern;
  depositing said transparent interlayer and said second DLC layer in turn; and
  forming said high-refractive index regions in said second DLC layer by irradiating it with an energy beam to raise its refractive index in a second predetermined pattern; wherein
  when said second DLC layer is being irradiated in said second predetermined pattern with an energy beam, said transparent interlayer acts to prevent the energy beam from having an effect on said first DLC layer.

18. An optical-fiber manufacturing method as set forth in claim 17, wherein the energy beam is selected from an X-ray beam, an electron beam, or an ion beam.

19. An optical-fiber manufacturing method as set forth in claim 17, wherein said first and second DLC layers are deposited by a plasma CVD technique.

* * * * *